INVENTOR.
ELLSWORTH D. WILKIN
BY White & Haefliger
ATTORNEYS.

United States Patent Office 3,441,296
Patented Apr. 29, 1969

3,441,296
HOSE COUPLING
Ellsworth D. Wilkin, 6339 W. 80th St.,
Los Angeles, Calif. 90045
Filed July 3, 1967, Ser. No. 650,922
Int. Cl. F16l 55/00, 33/00, 47/00, 49/00, 31/00
U.S. Cl. 285—174         4 Claims

ABSTRACT OF THE DISCLOSURE

A connector assembly which may easily be attached to plastic or rubber hose terminals. The assembly comprises inner and outer sleeves having annular protuberant portions and detent means for securing the sleeves to the hose. An internally threaded coupling member connects the sleeves to a tubular member having external threads.

Background of the invention

There is need for a hose connector which will meet certain stringent requirements. For example, the coupling must be such that the assembly to the hose can be accomplished without tools other than a knife and a pair of pliers; the coupling must be incapable of improper assembly to the hose and must not leak under normal operating pressures; the lack of squareness of the hose end must not adversely affect the leak-proof effectiveness of the final assembly; the assembly must stand up against being pulled apart under normal handling abuse or operating pressure, and at the same time should be removable; the connector must work equally well with rubber or plastic hose; and the coupling must be of low cost construction. To my knowledge, no known coupling meets all of the above listed requirements.

Summary of the invention

It is a major object of the invention to provide a hose connector which will satisfy all of the above requirements, and which therefore may be considered to incorporate unusually advantageous construction, mode of operation and results.

Make-up of the coupling structure as characterized in the abstract can be accomplished simply by screwing a tubular part such as a threaded nipple or faucet into the coupling member to displace the one flange on the inner sleeve into engagement with the flange on the outer sleeve, at which time the inner sleeve is fully assembled onto the hose and the latter is effectively squeezed by the protuberance on the outer sleeve to form a seal. Thereafter, the nipple may be removed from the coupling member, a washer inserted, and the nipple again screwed into the coupling member to complete the assembly. It will be noted that attachment of the connector to the hose is thus accomplished through use of the nipple or faucet to which the coupling member is ultimately to be attached, eliminating need for tools other than a knife to initially form the hose end and pliers to rotate the coupling member.

Additional features and objects of the invention include the provision of a local portion of the inner sleeve protuberant toward a shank portion of the outer sleeve which is non-protuberant toward the hose prior to closing together of the flanges; the positioning of local protuberances on the sleeves to become radially spaced to squeeze the hose therebetween when the flanges are interengaged; the provision of a detent tab on the outer sleeve and projecting inwardly into the hose and in the direction of the coupling member to resist pulling of the outer sleeve off the hose; the provision of sleeves which are free of protuberances toward the hose throughout the sleeve major lengths to enable axial pushing of the sleeves onto and into the hose; and the provision for attachment of another hose end to the assembly.

These and other objects and advantages of the invention, as well as the details of illustrative embodiments, will be more fully understood from the folowing detailed description of the drawings, in which:

Detailed description of preferred embodiments

Figure 1:
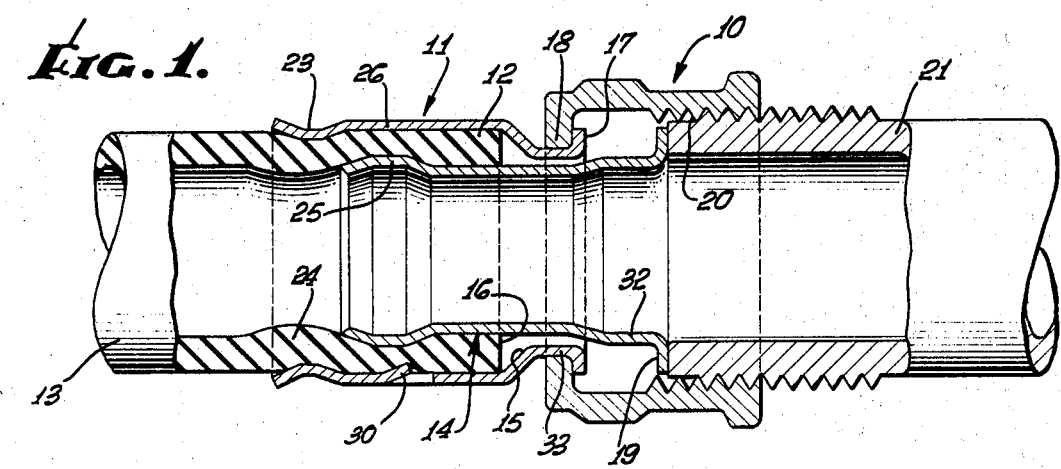
FIG. 1 is a vertical section showing one preferred form of the assembly, in partially made-up condition.
Figure 2:
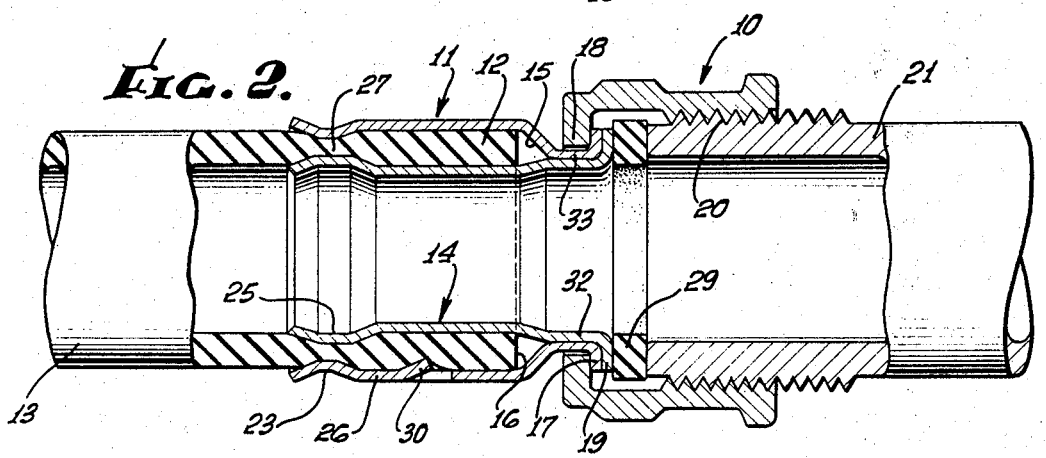
FIG. 2 is a view like FIG. 1 showing the assembly fully made-up.

The principal elements of the FIG. 1 and 2 assemblies comprise a tubular coupling member 10, an outer sleeve 11 assembled to the end portion 12 of flexible hose 13 and to the coupling, and an inner sleeve 14. The outer sleeve projects away from the member 10 in telescope and engaged relation with the hose, the sleeve being sized to fit rather easily over the hose end and to be advanced onto the hose until in-turned flange 15 engages the hose terminal 16. Note also the sleeve end flange 17 turned outwardly, the in-turned annular lip 18 on the member 10 being consequently retained between the flanges 15 and 17 whereby the sleeve 11 and member 10 remain assembled in generally coaxial relation.

Following such fitting of the outer sleeve on the hose, and to the extent seen in FIG. 1, the inner sleeve 14 is inserted into the outer sleeve via the interior of the member 10, and it is displaced coaxially into the hose end portion to extend in telescopic and engaged relation with the hose end portion inner side or bore, and inwardly of the outer sleeve. Such insertion brings the outwardly turned end flange 19 on the inner sleeve toward the end flange of and within the coupling member. Typically, the latter is threaded internally at 20, and the flange 19 is inserted sufficiently into the member 10 as to leave a connectible extent of the threading exposed for connection to a tubular part such as an externally threaded nipple or faucet 21.

It will be observed that the inner sleeve and hose bore are sized to be sufficiently free of interference as to allow relatively free and manual axial insertion of the inner sleeve into the hose member bringing the flange 19 into a position such as typified in FIG. 1. Thereafter, and as the part 21 is screwed into the member 10, the flange 19 is forcibly advanced or pushed toward and into clamping engagement with flange 17, reaction "pulling" force being transmitted to the hose via member 10 and outer sleeve 11. In this regard, a local portion of the outer sleeve spaced from the member 10 is protuberant inwardly to squeeze the hose and resist pulling of the outer sleeve off the hose. One example of such a protuberance is seen at 23, the protuberance being annular and deflecting the hose inwardly at 24. The inward deflection of the hose imposes resistance to driving home the inner sleeve to the position seen in FIG. 2; however, screwing of the nipple 21 into the coupling member or nut affords sufficient force development to complete the assembly. It will also be noted that a local portion 25 of the inner sleeve is protuberant toward a shank portion 26 of the outer sleeve which is non-protuberant toward the hose, as seen in FIG. 1. As the inner sleeve is driven home to FIG. 2 position, the annular protuberances 23 and 25 become radially spaced to tightly squeeze the hose therebetween, as seen at 27, the flanges 17 and 19 then being engaged. Accordingly, a very tight seal is established, to block leakage of fluid under high pressure. It should be noted that this beneficial result is obtained, along with the further advantage of initial easy insertion of the inner sleeve into the hose bore, since the sleeves are free of protuberances along their major lengths adjacent the hose. The local protuberances 23 and 25 do not "interfere" with sleeve insertion until the latter is almost completed.

Following such make-up, the nipple 21 is removed from member 10, a washer 29 (plastic or rubber) is inserted into member 10 to engage flange 19, and nipple 21 is again threaded into the member 10 to clamp the washer in seal establishing relation as seen in FIG. 2. FIGS. 1 and 2 also illustrate the provision, if desired, of a detent tab 30 on the outer sleeve and projecting inwardly into the hose and in the direction of member 10 to resist pulling of the outer sleeve off the hose. Finally, it will be noted that the inner sleeve is slightly enlarged at 32 to provide a pilot shoulder on which the outer sleeve annular extent 33 may pilot during completion of make-up. This brings all the elements into close coaxial alignment at make up completion.

Figure 3:
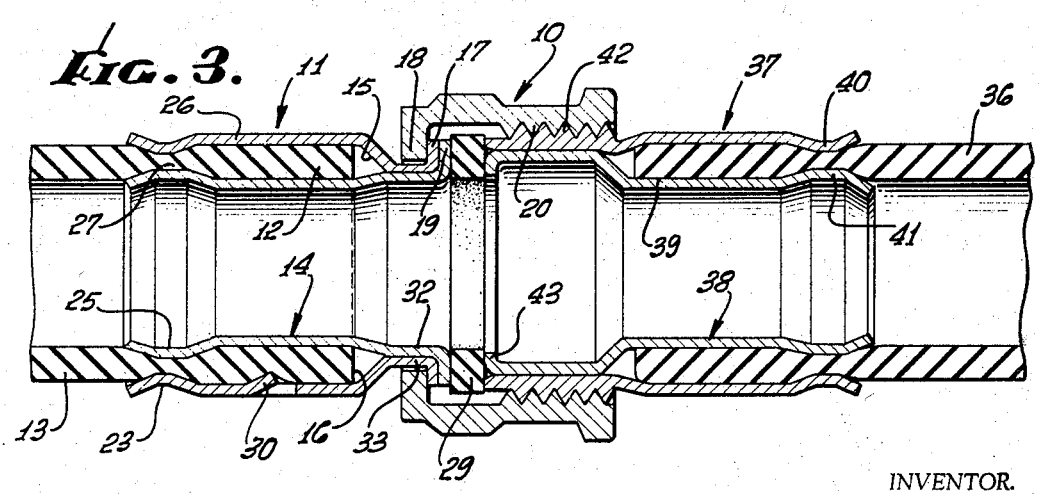
FIG. 3 is a vertical section showing a modified form of the invention.

Much of FIG. 3 illustrates the same structure as described above, and bearing the same numerals. In place of the nipple 21, however, additional sleeves are provided, to be assembled on the second hose 36 in much the same manner as described above. Thus, a second outer sleeve 37 is assembled onto the second hose to the position shown, and a second inner sleeve 38 is pushed into the bore 39 of the hose; however, such insertion of the inner sleeve is not completed to the extent bringing protuberances 40 and 41 into radial alignment as seen in FIG. 3. The latter is left to be completed as the outer sleeve 37 is screwed into the coupling nut 10, the outer sleeve 37 having threading 42 for this purpose. During such thread make-up, the end flange 43 on sleeve 38 bears against washer 29, and clamping force completes the insertion of the inner sleeve 38 into bore 39 to the extent seen in FIG. 3. Thus, a complete connection may be effected between two flexible hoses.

I claim:

1. For combination with the end portion of a flexible hose having inner and outer sides,
  a tubular coupling member having internal threading and an inwardly extending generally radial shoulder,
  an outer sleeve assembled to the hose end portion and to the coupling member in generally coaxial relation to project away from said member in telescopic and engaged relation with the hose end portion outer side, and
  an inner sleeve inserted into the outer sleeve and displaced coaxially into the hose end portion to extend in telescopic and engaged relation with the hose end portion inner side and inwardly of the outer sleeve,
  a local portion of the outer sleeve spaced from the coupling member being protuberant inwardly,
  the sleeves having clamping load transmitting flanges in alignment within the coupling member to be clamped axially between the coupling member shoulder and a tubular washer engaging one of said load transmitting flanges on the inner sleeve,
  said inner sleeve and hose being sized to be sufficiently free of interference as to allow relatively free initial axis insertion of the inner sleeve into the hose member bringing said one flange fully into the coupling member beyond a connecting extent of the internal threading thereof and toward the flange on the outer sleeve,
  a tubular element having external threading interfitting the coupling member internal threading to urge the coupling member in a direction tending to pull the outer sleeve off the hose and having an end face to transmit force clamping the washer in sealing engagement with the inner sleeve flange,
  a local portion of the inner sleeve being protuberant outwardly at a location inwardly of said outer sleeve inwardly protuberant portion to squeeze the hose therebetween when said flanges are clamped in load transmitting relation, said locally protuberant portions being generally reversely curved, annular and disposed proximate the end portion of the sleeves,
  the outer sleeve having detent structure located between said local proturberant portion and said flange on the outer sleeve and projecting into the hose to resist pulling of the outer sleeve off the hose,
  the inner and outer sleeves having shank portions which are generally cylindrical and having substantially constant wall thickness throughout their lengths.

2. The combination of claim 1 wherein said detent structure comprises a detent tab projecting inwardly into the hose and in the direction of the coupling member.

3. The combination of claim 1, wherein said tubular member comprises a second outer sleeve, and including a second inner sleeve received within the second outer sleeve and exerting clamping force against the side of the washer opposite said flanges, said second outer and inner sleeves projecting away from the coupling member and receiving a second hose end portion therebetween in sealing engagement therewith.

4. The combination of claim 1, wherein the sleeves are free of protuberances toward the hose throughout the major lengths of the sleeves adjacent the hose.

References Cited

UNITED STATES PATENTS

| 1,233,644 | 7/1917 | Clark | 285—246 X |
| 1,665,812 | 4/1928 | Jones | 285—246 |
| 2,273,398 | 2/1942 | Couty et al. | 285—259 X |
| 2,326,439 | 8/1943 | Clements | 285—259 X |
| 2,414,789 | 1/1947 | Anderson | 285—248 |
| 3,220,753 | 11/1965 | Kasidas | 285—174 |

FOREIGN PATENTS

| 1,055,473 | 10/1953 | France. |
| 549,067 | 10/1956 | Italy. |

THOMAS F. CALLAGHAN, *Primary Examiner.*

U.S. Cl. X.R.

285—245